(12) United States Patent
Liu et al.

(10) Patent No.: US 11,386,339 B2
(45) Date of Patent: Jul. 12, 2022

(54) ARTIFICIAL INTELLIGENCE DELIVERY EDGE NETWORK

(71) Applicant: GLOBAL ELMEAST INC., Sunnyvale, CA (US)

(72) Inventors: Zaide Liu, Beijing (CN); Ken Zhang, Saratoga, CA (US); Yue Guo, Beijing (CN)

(73) Assignee: GLOBAL ELMEAST INC., Sunnyvale, CA (US)

(*) Notice: Subject to any disclaimer, the term of this patent is extended or adjusted under 35 U.S.C. 154(b) by 361 days.

(21) Appl. No.: 16/286,471

(22) Filed: Feb. 26, 2019

(65) Prior Publication Data

US 2020/0272920 A1 Aug. 27, 2020

(51) Int. Cl.

| | | |
|---|---|---|
| G06N 5/04 | (2006.01) | |
| G06K 9/62 | (2022.01) | |
| H04L 67/567 | (2022.01) | |
| H04L 67/59 | (2022.01) | |
| G06F 9/50 | (2006.01) | |
| H04M 3/42 | (2006.01) | |

(52) U.S. Cl.
CPC ........... *G06N 5/043* (2013.01); *G06F 9/5005* (2013.01); *G06K 9/6227* (2013.01); *H04L 67/2838* (2013.01); *H04L 67/2861* (2013.01); *H04M 3/42144* (2013.01)

(58) Field of Classification Search
CPC .......... G06N 5/043; G06N 5/003; G06N 3/02; G06N 20/00; G06K 9/6227; H04L 67/2838; H04L 67/2861; H04M 3/42144; G06F 9/5005
See application file for complete search history.

(56) References Cited

U.S. PATENT DOCUMENTS

| | | | |
|---|---|---|---|
| 10,735,528 B1 * | 8/2020 | Shafiullah | H04L 65/1066 |
| 2019/0138908 A1 * | 5/2019 | Bernat | G06N 3/0454 |
| 2020/0084202 A1 * | 3/2020 | Smith | H04L 67/28 |
| 2020/0151551 A1 * | 5/2020 | Zhang | G06N 5/022 |
| 2020/0195495 A1 * | 6/2020 | Parker | H04W 48/18 |
| 2020/0272899 A1 * | 8/2020 | Dunne | G06N 3/0454 |
| 2021/0006625 A1 * | 1/2021 | Migault | H04L 67/14 |

* cited by examiner

*Primary Examiner* — Arvin Eskandarnia
*Assistant Examiner* — Chhian (Amy) Ling
(74) *Attorney, Agent, or Firm* — Wong & Rees LLP; Zhichong Gu (57) ABSTRACT

Approaches, techniques, and mechanisms are disclosed for accessing AI services from one region to another region. An artificial intelligence (AI) service director is configured with mappings from domain names of AI cloud engines to IP addresses of edge nodes of an AI delivery edge network. The AI cloud engines are located in an AI source region. The AI delivery edge network is deployed in a non-AI-source region. An AI application, which accesses AI services using a domain name of an AI cloud engine in the AI cloud engines located in the AI source region, is redirected to an edge node in the edge nodes of the AI delivery edge network located in the non-AI-source region. The AI application is hosted in the non-AI-source region. The AI services is then provided, by way of the edge node located in the non-AI-source region, to the AI application.

21 Claims, 7 Drawing Sheets

ARTIFICIAL INTELLIGENCE DELIVERY EDGE NETWORK

TECHNICAL FIELD

Embodiments relate generally to artificial intelligence (AI) systems, and, more specifically, to artificial intelligence delivery edge network (AIDEN).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

AI based machine learning may be applied to a wide variety of technical fields and/or industries. For example, a healthcare AI application may be deployed at a healthcare facility to help a healthcare worker determine a best-practice normal or urgent care action with regards to a patient based on the patient's medical information collected in real time or in the past. To obtain a recommendation for the best-practice normal or urgent care action, the health AI application may contact or communicate with an AI service provider system that has implemented an automated AI healthcare recommendation model. The model may be trained and optimized with a relatively large set of up-to-date healthcare data continuously collected from a relatively large population over a relatively long time to provide highly accurate, highly reliable automated healthcare recommendations that are significantly better than what average human healthcare experts may be able to offer. As a result, many patients can receive better and more reliable healthcare with the recommendations provided by the AI service provider system.

However, for healthcare facilities and/or professionals located at regions with no or little networking capabilities to contact or communicate with AI service provider systems implementing automated AI healthcare recommendation models, patients may encounter risks of suboptimal and/or delayed healthcare services, if on-site healthcare professionals are not able to come up with the best-practice healthcare recommendations that match accuracies and reliabilities of those from the AI service provider systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
2.1. AI Applications and Source Systems
2.2. AI Delivery Edge Network
2.3. Accessing AI Services via AI Proxy Agent
2.4. Directly Accessing AI Cloud Engines
2.5. Directly Providing AI Services From AIDEN
3.0. Example Embodiments
4.0. Implementation Mechanism—Hardware Overview
5.0. Extensions and Alternatives

1.0. General Overview

Techniques as described herein can be used to set up one or more AI delivery edge networks (AIDENs) in one or more non-AI-source regions outside an AI source region in which AI cloud engines are located. The AIDENs deployed in the non-AI-source regions allow a wide variety of AI applications in the non-AI-source regions to access a wide variety of AI services originated and provided from the AI cloud engines located in the AI source region.

An AIDEN as described herein can serve as a cloud platform for cross-country or cross-national-boundary delivery of AI services. The cloud platform enables AI applications operating in a non-US region such as India, Japan, China, etc., to access AI cloud engines located in a U.S. region or a U.S. network cloud with relatively high performance and relatively low costs. For example, AI services originated from the AI cloud engines in the U.S. region such as Google AI (e.g., TensorFlow AI service stack, etc.), IBM Watson, Stanford Natural Language Processing, etc., can be provided by way of the AIDEN.

Under techniques as described herein, AI applications, the AIDEN, and/or AI cloud engines can gain and collect large amounts of testing and training data. Big data related to a wide variety of AI application types and fields can be collected from the non-U.S. regions by way of the AI applications and AIDEN, analyzed by the AI cloud engines and/or the AIDEN, used to improve accuracy and reliability for AI based machine learning and prediction.

An AIDEN as described herein may comprise edge nodes located close to, and accessible by, the AI applications through a network cloud in the non-AI-source region as well as non-edge nodes performing non-edge specific operations. The AIDEN can implement a set of (e.g., core, etc.) functions such as cloud functions, AI functions, service operational functions, and so forth.

A variety of AI service delivery methods can be used to deliver AI services with the AIDEN. In an example, one or more AI applications can run on systems outside the AIDEN and access the AI services originated or sourced from the AI cloud engines in the U.S. region through a unified AI service interface implemented or provided by the AIDEN or AI edge nodes therein. The unified AI service interface may comprise a set of AI application programming interface (API) calls (e.g., AIDEN specific APIs, AI cloud engine specific APIs, etc.). The AI API calls can be proxied, implemented and/or supported by the AIDEN.

In another example, AI edge computing may be supported by some or all of the AI edge nodes in the AIDEN. One or more AI (engine) containers (e.g., Kubernetes based containers, etc.) may be provisioned with an AI edge node as described herein to run one or more AI applications in the AI containers rather than to run the AI applications in customer premises systems or systems outside the AIDEN.

An AI container as described herein may comprise AI related libraries/functions that can be used by an AI application running in the AI container. The AI container, or the AI related libraries/functions therein, can be used to implement or provide, to the AI application running in the AI container, proxy services, API services, etc., in connection with AI cloud engines in the U.S. region.

The AIDEN may comprise one or more AI service directors to redirect AI service calls that are intended for, or use domain names of, the AI cloud engines located in the U.S. region to AI proxy services implemented by the AIDEN. The AI proxy services in the non-U.S. region may communicate with AI proxy agents deployed in the U.S. region through virtual private networks (VPNs), unified delivery networks (UDNs), or other firewall penetrating techniques to relay AI service calls to the AI cloud engines in the same U.S. region ad relay back any AI service responses from the AI cloud engines to the AI proxy services and the AI applications in the non-U.S. region, whether these AI applications run in AI containers of the AIDEN or run elsewhere in the non-U.S. region.

Through the unified AI service interface and/or AI containers, which serve as a one-stop AI engine/service store or as a unified interface to some or all the AI services provided by some or all of the AI cloud engines, the AIDEN allows AI application to make AI service calls to access and obtain AI services originated from the AI cloud engine without performance penalty or network access denial. Indeed, the AIDEN can implement a variety of performance acceleration techniques to provide AI service qualities—to AI applications in the non U.S. region—at levels that are comparable to, or even exceed, the AI service qualities received/experienced by AI application operating in the U.S. region.

For example, an AI container as described herein can be used to replicate, mirror and/or cache some or all of an AI service stack or AI service call APIs implemented or used by an AI cloud engine to provide a set of AI services. In addition to or instead of serving out the AI services by making AI service calls (e.g., via AI proxy services in the non-U.S. region and AI proxy service agents in the U.S. region, etc.) to AI cloud engines in the U.S. region, some or all of the AI service calls can be processed locally by the AIDEN through AI edge computing, AI containers, etc., which have replicated, mirrored and/or cached AI service stacks and/or AI service call APIs supporting some or all of the AI services locally in the non-U.S. region.

Thus, the entire AI service stack or AI service all APIs may be transplanted to another region based on operational agreements/licenses/permissions arranged between operators of the AIDEN and the AI cloud engines. Basic configurations, network/cloud functions, and/or complete sets of AI service stacks such as Google TensorFlow AI engine and APIs, Stanford NLP, IBM Watson, Facebook Caffe2, and so forth, can all be cached by the AIDEN operating in the non-U.S. region. Additionally, optionally or alternatively, AI services originated from the AI cloud engines in the U.S. region can be localized in terms of languages (e.g., Chinese, Indian, Japanese, etc.), technical/customer support, service operations, customer billing, AI data storage, etc.

Example approaches, techniques, and mechanisms are disclosed for AI delivery edge networks.

According to one embodiment, an artificial intelligence (AI) service director is configured with one or more mappings from one or more domain names of one or more AI cloud engines to one or more internet protocol (IP) addresses of one or more edge nodes of an AI delivery edge network. The one or more AI cloud engines are located in an AI source region. The AI delivery edge network is deployed in a non-AI-source region. An AI application, which accesses one or more AI services using a domain name of an AI cloud engine in the one or more AI cloud engines located in the AI source region, is redirected to an edge node in the one or more edge nodes of the AI delivery edge network located in the non-AI-source region. The AI application is hosted in the non-AI-source region. The one or more AI services is then provided, by way of the edge node located in the non-AI-source region, to the AI application.

In other aspects, the invention encompasses computer apparatuses and computer-readable media configured to carry out the foregoing techniques.

2.0. Structural Overview

Figure 1:
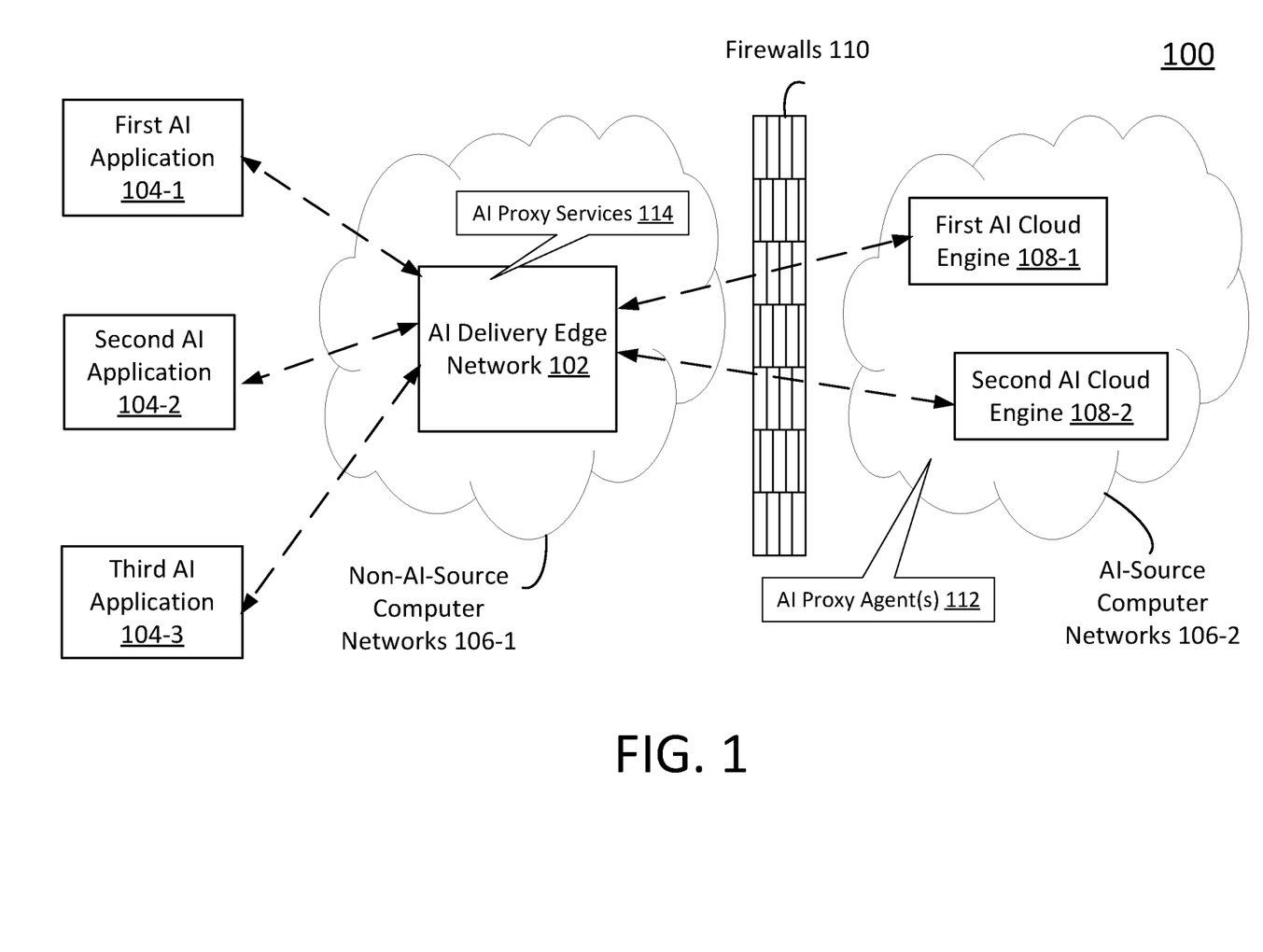
FIG. 1 is an illustrative view of various aspects of an example system.

FIG. 1 is an illustrative view of various aspects of an example system 100 in which the techniques described herein may be practiced, according to an embodiment. System 100 comprises one or more computing devices. The one or more computing devices comprise any combination of hardware and software configured to implement the various logical components described herein, including components such as an AI delivery edge network (AIDEN) 102, AI applications 104-1 through 104-3, AI cloud engines 108-1 and 108-2, and so forth. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. AI Applications and Source Systems

As shown in FIG. 1, system 100 comprises one or more AI cloud engines 108-1, 108-2, etc., each of which may be implemented with one or more computing devices. An AI cloud engine as described herein may provide a (e.g., cloud, etc.) platform that packages a set of AI services that can be accessed over one or more AI source computer networks (e.g., 106-2, etc.) by AI applications in one or more fields and/or industries such as optical character recognition, handwriting recognition, speech recognition, face recognition, image processing, healthcare diagnosis, natural language processing, autonomous driving, data mining, and so forth. Example AI cloud engines may include, but are not necessarily limited to only, any of: IBM Watson, Google AI, Stanford Natural Language Processing (NLP), Facebook AI, Amazon Machine Learning (ML), and so forth.

System 100 comprises one or more AI applications 104-1 through 104-3 implemented with one or more computing devices and hosted (or executed) at one or more of: AI assisted/enabled devices and/or systems of healthcare service systems, autonomous vehicles, logistics systems, internet of things (IoTs), and so forth.

In some operational scenarios, the AI applications 104-1 through 104-3 may be located outside (e.g., outside the U.S.A., etc.) the one or more AI source computer networks (106-2) (e.g., in the U.S.A., etc.). The AI applications 104-1 through 104-3 may have no or very limited communication/network capabilities (e.g., in terms of network reachability, bandwidth, response time, latency, access control, firewall, etc.) on their own to make direct and/or indirect communication/network access to the AI cloud engines 108-1, 108-2, etc., located in the AI source computer networks (106-2). In some embodiments, the AI applications 104-1 through 104-3 are located with one or more non-AI-source computer networks (106-1), which may be separated from the one or more AI source computer networks (106-2) one or more firewalls 110. As a result, the AI applications 104-1 through 104-3 may be prevented by the one or more firewalls 110 from (e.g., directly, etc.) accessing the AI source computer networks, or the AI cloud engines 108-1, 108-2, etc.

An AI application as described herein such as one of AI applications 104-1 through 104-4 or the like may refer to a computer-implemented application that comprises AI-related code segments, which when executed by one or more computer processors, to access and interact (e.g., in real time, in near real time, offline, etc.) with the first AI cloud engine 108-1, the second AI cloud engine 102, etc. An AI-related code segment in the AI application, as executed by the one or more computer processors, may cause an AI service request message destined to a specific AI cloud engine to be originated from the AI application.

Because of network access limitations/restrictions (e.g., firewall, etc.) caused by not being located in the AI source computer networks (106-2) and/or the one or more firewalls 110, the AI service request message originated from the AI application may be blocked (e.g., experience timeout errors in AI service requests, etc.) from reaching the specific AI cloud engine within an operable time budget (e.g., for autonomous driving, for real time urgent care actions, etc.). As a result, the AI application may be effectively prevented (e.g., blocked, unreachable within a specific time budget, etc.) from accessing AI services as provided by the AI cloud engine 108-1, 108-2, etc.

Under techniques as described herein, system 100 comprises the AI delivery edge network 102 that provides or supports a unified AI service interface (e.g., AI interface 220 of FIG. 2, etc.) to the AI services originated from the AI cloud engine 108-1, 108-2, etc., in the AI source computer networks (106-2). The unified AI service interface, as provided by the AI delivery edge network 102, in the one or more non-AI-source computer networks (106-1) exposes or allows the AI services originated from the AI cloud engine 108-1, 108-2, etc., to be accessed (or accessible) through the unified AI service interface by the AI applications 104-1 through 104-3. In some operational scenarios, the unified AI service interface not only maps APIs supported by an original AI cloud engine, but also encapsulates or provides its own AI service interface (e.g., a standalone AI service interface portion, a separate AI service interface portion, etc.). Additionally, optionally or alternatively, in some embodiments, the AI delivery edge network 102 implements or includes system/network functions such as management of edge nodes, storage and distribution of data (real-time and offline data etc.), agent for requesting and replying of communication, calculation scheduling (e.g., load balancing, workload partitioning, etc.), multinational access agent networks, security support systems, and so forth. Additionally, optionally or alternatively, in some embodiments, the AI delivery edge network 102 may include or implement an AI proxy network that provides a unified AI service interface which (e.g., directly, etc.) maps APIs supported by an original AI cloud engine 108-1, 108-2, etc. and redirects AI service requests from the AI delivery edge network 102 to the AI cloud engine. Redirecting the AI service requests may be performed by a load balancing cluster that implements load balancing techniques in handling workloads. Additionally, optionally or alternatively, in some embodiments, system 100 includes a distributed schedule manager, for example as a part of or as a cooperating system located between the AI delivery edge network 102 and the AI proxy network 112. The distributed schedule manager can be used to manage system configuration, to monitor statuses of edge nodes for automated scheduling data storage, network orientation, link traffic distribution, etc., to detect and handle system configuration changes, abnormalities of edge nodes, etc., in real-time, dynamically, and so forth. The distributed schedule manager or another system may operate in conjunction with, or may be a part of, the AI delivery edge network 102), to implement or perform background (or backend) system operations and system maintenance.

Communication/network access by the AI applications 104-1 through 104-3 to the AI delivery edge network 102 (including but not limited to communication/network access to the unified AI service interface) located in the non-AI-source computer networks (106-1) is not blocked (e.g., by firewall, access control, etc.), and can be carried out with relatively high bandwidth, relatively high performance, relatively short response times, as compared with network communication operations (without using the AI delivery edge network 102) between the AI applications 104-1 through 104-3 and the AI source computer networks (106-2).

As a result, the AI applications 104-1 through 104-3 can access the AI services originated from the AI cloud engine 108-1, 108-2, etc., to be accessed (or accessible) through the unified AI service interface with relatively high efficiency and relatively low costs (e.g., in terms of ready and efficient network reachability, high bandwidth, short response time, low latency, free of access control restrictions, firewall penetrating, etc.).

Example computer networks (e.g., 106-1, 106-2, etc.) as described herein include, but are not necessarily limited to, wired networks, wireless networks, optical networks, local area networks (LANs), wide area networks (WANs), core networks, virtual private networks (VPNs), unified delivery networks (UDNs), carrier networks, intranets, the internet, public networks, private or proprietary networks, satellite networks, dedicated network links/paths, service provider networks, cellular networks, radio networks, access networks, edge networks, inter-regional networks, international networks, and so forth. Further, communications and exchanges of AI service requests and responses, over some or all of the computer networks 106-1, 106-2, etc., may utilize a variety of networking protocols, including but not necessarily limited to only TCP/IP based networking protocols, HTTP protocols, JSON related protocols, XML protocols, REST related protocols, and so forth.

2.2. AI Delivery Edge Network

Figure 2:
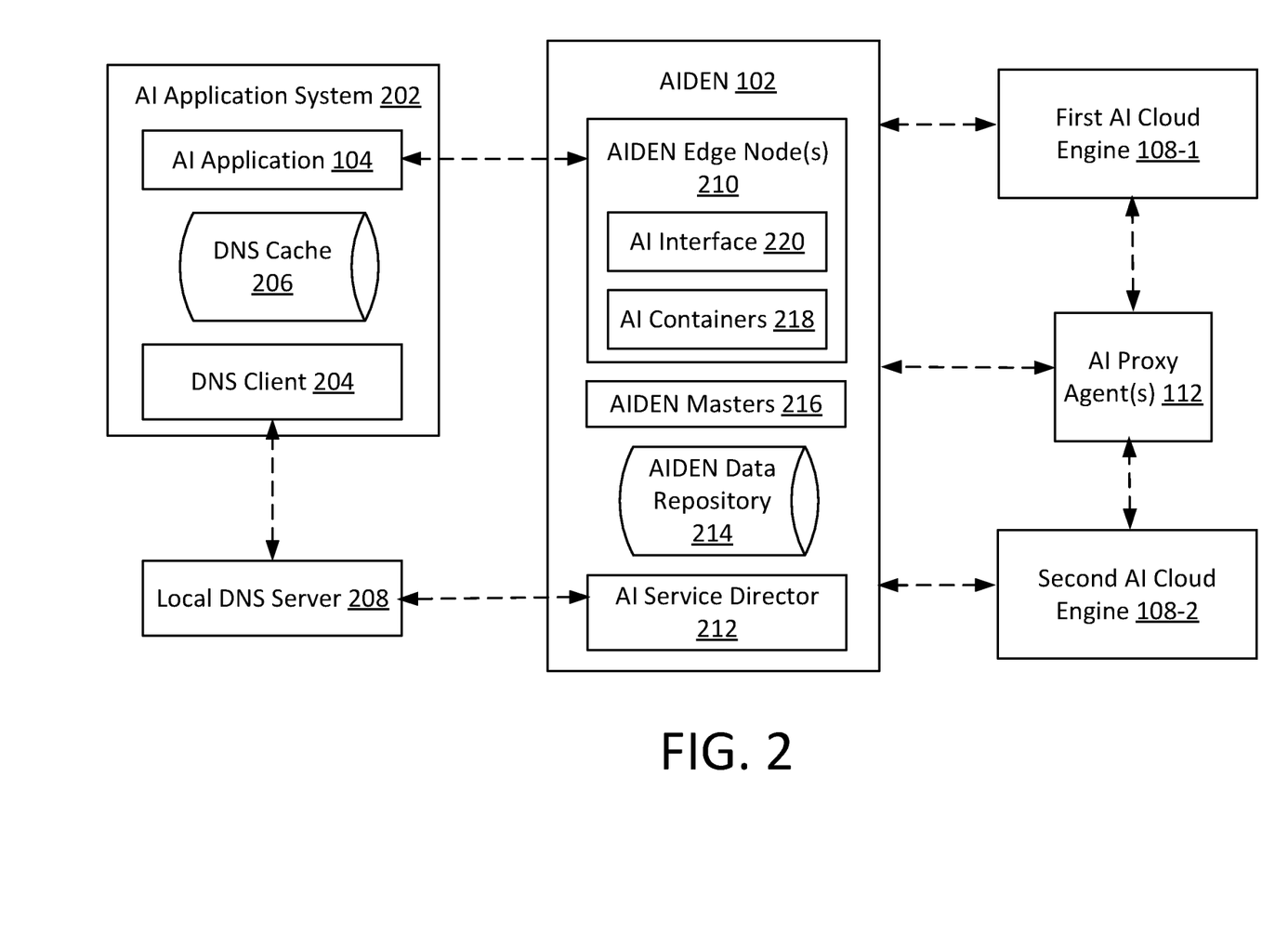
FIG. 2 is an illustrative view of various aspects of an example AI delivery edge network or AIDEN.

FIG. 2 is an illustrative view of various aspects of an example AI delivery edge network or AIDEN (e.g., 102 of FIG. 1, etc.) in which the techniques described herein may be practiced, according to an embodiment. AIDEN 102 comprises one or more computing devices. The one or more computing devices comprise any combination of hardware and software configured to implement the various logical components described herein, including components such as AI service director 212, AIDEN masters 216, AI service nodes including but not limited to AIDEN edge nodes 210, and so forth. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

The AI delivery edge network 102 comprises AIDEN edge nodes 210 deployed at one or more different geographic locations, different network topology locations, etc. The AIDEN edge nodes 210 are proximate to, collocated with, within a threshold number of network hops, within the same access network, within the same regional network, within the same service provider network, etc., as some or all of systems and/or devices on which the AI applications 104-1 through 104-3 are hosted or executed.

Each of the AIDEN edge nodes 210 in the AIDEN 102 may be used to implement some or all of the unified AI service interface to the AI services originated from the AI cloud engines (e.g., 108-1, 108-2, etc.) and allow an AI application 104—which may be one of 104-1 through 104-3 of FIG. 1—as described herein to access some or all of the AI services originated from the AI cloud engines (e.g., 108-1, 108-2, etc.) normally with relatively high network performance as compared with directly accessing the source AI computer networks (106-2) without being (e.g., negatively, severely, etc.) impacted by network access limitations/restrictions existing between the AI application and the source AI computer networks (106-2).

The AI application 104 running on an AI application system 202 (e.g., a host system or container of an AIDEN edge node, a computer server, a computer cluster, an application server system, a database system, a handheld device, game machine, laptop computer, netbook computer, tablet computer, desktop computer, computer workstation, etc.) may execute AI-related code segments to cause AI service request messages destined to the first AI cloud engine 108-1, the second AI cloud engine 108-2, etc., to be originated from the AI application 104.

By way of example but not limitation, an AI-related code segment in the AI application 104 may implement a PHP curl call that sends an AI service request message in the form of an HTTP request to an AI service provider website or web server which an AI cloud engine (e.g., 108-1, 108-2, etc.) uses as an AI service interface 220 (e.g., supporting a set of AI API calls, etc.) to interact with one or more AI service client(s) such as the AI application 104 in the present example.

The HTTP request may comprise a resource locator such as a Universal Resource Locator (URL), etc., with a domain name identifying the AI cloud engine. The domain name may be resolved to an IP address through a domain name resolution process. A DNS client (e.g., a DNS resolver process, etc.) 204 in the AI application system 202 may first determine whether the domain name can be mapped to an IP address, another domain name, etc., based on an AI application system DNS cache 206, a hosts file, etc. If the domain name cannot be resolved to an IP address based on the AI application system DNS cache 206, the hosts file, etc., the DNS client sends a DNS query (e.g., a recursive DNS query, etc.) to a local DNS server 208 for resolving the domain name to an IP address.

The local DNS server 208 may be a recursive name server with capability to query other name servers (e.g., DNS servers, root name server, zone name servers, etc.) hierarchically to obtain a host address (e.g., an IP address, a non-domain-name network address, etc.) for a queried domain name. If a host address for the domain name is not found in a local DNS server cache, the local DNS server can query other name servers such as the AI service director 212, which may be implemented as an authoritative DNS server designated with authority for providing authoritative DNS information on domain names located in a portion of a DNS name space that includes the AI cloud engine (e.g., 108-1, 108-2, etc.) to which the HTTP request is destined/addressed.

The AI service director 212 can select and return (e.g., an IP address of, etc.) a specific AIDEN edge node among the AIDEN edge nodes 210 based on one or more selection criteria. Example selection criteria for selecting edge nodes may include, but not necessarily limited to, one or more of: proximities of the edge nodes to the AI application system 202, computing resources availabilities of the edge nodes, current resource usages of the edge nodes, etc.

Once the specific AIDEN edge node is selected from among the AIDEN edge nodes 210, an IP address of the selected AIDEN edge node may be returned directly or indirectly by the AI service director 212 to the local DNS server 208, which in turn returns, to the DNS client 204, and caches the IP address of the selected AIDEN edge node as the IP address to which the domain name of the AI cloud engine is now resolved (e.g., within a specific time period, etc.).

In response to receiving the IP address of the selected AIDEN edge node to which the domain name of the AI cloud engine is now resolved, the HTTP request is redirected to the selected AIDEN edge node. In addition, the IP address of the selected AIDEN edge node may be saved in the AI application system DNS cache 206 as the IP address to which the domain name of the AI cloud engine is now resolved (e.g., within the specific time period, etc.).

Thereafter, the AI application 104 can communicate or interact (e.g., in real time, in near real time, etc.) with the selected AIDEN edge node to obtain AI services originated from the AI cloud engine.

The AI delivery edge network 102 comprises AIDEN masters 216 that operate in conjunction with edge nodes to implement or perform a plurality of AIDEN (e.g., core, attendant, cloud, AI, client management, etc.) system functions/operations such as AIDEN core functions/operations, AIDEN cloud functions/operations, and so forth. Server load balancing (SLB) processors may be implemented with some or all of the edge nodes and/or the master nodes deployed at one or more regional or central geographic locations, different network topology locations, etc. These SLB processors can be used to distribute traffic and content, increase service availability, support online expansion, keep conversations and improve data security. A SLB processor can be used to receive and process request from AIDEN edge nodes 210. When a request is received, the SLB processor can automatically route the request to a selected master node based on one or more master node selection factors, including but not limited to, based on a specific source IP address, based on geographic location, based on simple pollings, direct average access, based on response time, based on the health of the device, based on the minimum connection, and so forth. Multiple SLB processors, multiple edge nodes, multiple master nodes, etc., can be deployed at a central location or multiple locations to backup each other or one another, for example in order to avoid a single point of failure of the entire system caused by a failure of a SLB processor, an edge node, a master node, etc. Some or all of these devices, processors nodes, etc., can (e.g., consistently, with high availability, with fault tolerance, etc.) maintain AI service related state information and AI service related data in real time. Master nodes as described herein can be deployed at one or more regional locations of AIDEN. The master nodes can form a hierarchical structure with one or more different layers. In a nonlimiting example embodiment, some or all of the master nodes can be organized to form an orderly tree structure in which a specific layer such as a first layer, a leaf layer, etc., may be used to transfer AI service related data, to process AI service requests, and so forth.

Example AIDEN core functions/operations implemented or performed by the AIDEN may include, but are not necessarily limited to only, any of: AI service platform proxy services/agents, AI service performance acceleration/optimization, AI engine containers, AI edge computing, local AI data storage, local AI service billing, AI service statistics, AI service customer management, etc.

The AI service platform proxy services/agents functions/operations can be used to provide—e.g., in response to receiving AI service requests or DNS queries destined for AI cloud engines originating AI services as described herein—AI service directions/redirections to AIDEN edge nodes, AI proxy services (e.g., 114 of FIG. 1, etc.) provided by AIDEN edge or non-edge nodes, etc., instead of the AI cloud engines directly.

The AI service performance acceleration/optimization functions/operations can be used to provide load balancing among AIDEN edge nodes, load balancing among AI cloud engines, etc. For example, an optimized AIDEN edge or non-edge node can be selected from among a plurality of candidate AIDEN edge or non-edge nodes based on computing, networking and/or service resource availability in respective AIDEN edge or non-edge nodes among the plurality of candidate AIDEN edge or non-edge nodes.

The AI engine container functions/operations can be used to provide a one-stop store for some or all of AI services originated by the AI cloud engines, such as an AI engine container 218 that provides AI libraries for AI services to be performed locally at one or more AIDEN edge nodes, and/or to be performed by one or more AIDEN non-edge nodes, and/or to be performed remotely by one or more AI cloud engines. The AI libraries made available or deployed in the AI engine container 218, along with any other application libraries made available or deployed in the AI engine container 218, enable a client to run a hosted AI application in the AI engine container 218 to (e.g., seamlessly, transparently, without special handling by an AI application, etc.) access AI services provided by the AI delivery edge network 102 in the non-AI-source computer networks (106-1) and/or by the AI cloud engines in the AI source computer networks (106-2).

The AI edge computing functions/operations can be used to push or distribute AI related computing from the AI cloud engines to the AI delivery edge network 102, and even to edge nodes of the AI delivery edge network 102. For example, an AIDEN edge node as described herein may implement some or all of AI service stack implemented or originated from one or more AI cloud engines. The AI service stack implemented or accessible by the AIDEN edge node may be directly used by the AIDEN edge node to perform local AI service operations to provide some or all of AI services originated from the AI cloud engines.

The local AI data storage functions/operations can be used to perform CRUD (create, read, update, delete) operations with respect to AI data generated for an AI application. For example, the AI application can invoke an AI service to train a prediction model with a set of training data (e.g., gathered or enhanced by an AI service client, etc.). Some or all results of training the prediction model such as operational parameters, coefficients, weights, functional forms, error measurements, etc., can be saved in the AI delivery edge network 102 or one or more edge nodes thereof, rather than in AI cloud engine(s).

The local AI service billing functions/operations can be used to maintain AI service billing records for AI services, data storage services, computing resource usages, communication/network services, and so forth, incurred by one or more AI applications. The AI billing service records may record some or all of: the total number of AI service requests, data volumes/sizes, types of AI services incurred, applicable AI service rates, etc. A client who run the AI applications may be billed based on the AI service records.

The AI service statistics functions/operations can be used to collect and maintain AI service statistics for AI services, data storage services, computing resource usages, communication/network services, and so forth, across a set of AI applications, a set of AIDEN edge nodes, a set of AI cloud engines, etc. The AI service statistics may be used to isolate realtime and/or non-realtime problems/issues related to the AI delivery edge network 102, the AI cloud engines, etc., determine AI service trends, plan and forecast system needs, etc.

The AI service customer management functions/operations can be used to allow AI service clients to access information, resources, customer services, etc., regarding AI services that have been rendered or can be rendered, obtain documentations about API calls, demos, sample applications, AI models, augmented AI services, premium AI services, etc.

Some of the AIDEN core functions/operations implemented and/or performed by the AIDEN may be cloud functions (or cloud-based functions). Example cloud functions may include, but are not necessarily limited to only, any of: AI proxy services/agents, persistent storage, cache, journaling, firewall penetration, network acceleration, billing, licensing, customer management (e.g., customer relationship management, customer authentication and/or authorization, etc.), etc.

For example, the service platform proxy service/agent functions/operations may be used to implement or provide an AI proxy service (e.g., 114 of FIG. 1, etc.) in the non-AI-source computer networks (106-1) as a part of the AI delivery edge network 102 and an AI (service) proxy agent (e.g., 112 of FIG. 1 or FIG. 2, etc.) in the AI-source computer networks (106-2). The AI proxy service 114 (e.g., a platform function of the AI delivery edge network 102, etc.) and the AI proxy agent 112 may be communicatively linked through a (e.g., high bandwidth, high throughput, low latency, through core transport networks, through dedicated network links, a UDN, etc.) virtual private network (VPN) that penetrates the one or more firewalls 110 separating the non-AI-source computer networks (106-1) from the AI source computer networks (106-2).

The AI proxy service 114 can be used to interface or interact with an AI application in a non-AI-source region (e.g., in the one or more non-AI-source computer networks 106-1, etc.) on one side and interact with the AI proxy agent 112 in the AI source region (e.g., in the one or more AI-source computer networks 106-2, etc.).

The AI proxy agent 112 (e.g., implemented either within or outside an AI cloud engine, etc.) in the AI source region can directly or indirectly interface or interact with one or more AI cloud engines with relatively high AI service performance, receive and relay any AI service requests to the one or more AI cloud engines from the AI application by way of the AI proxy service 114 in the non-AI-source region, receive and relay any AI service responses to the AI application from the one or more AI cloud engines by way of the AI proxy service 114 in the non-AI-source computer networks (106-1), and so forth.

The AI proxy service (e.g., 114 of FIG. 1, etc.) in the non-AI-source region can directly or indirectly interface or interact with the AI application with relatively high performance, receive and relay any AI service requests to the one or more AI cloud engines from the AI application by way of the AI proxy agent 112 in the AI source region, receive and relay any AI service responses to the AI application from the one or more AI cloud engines by way of the AI proxy agent 112 in the AI source computer networks (106-2), and so forth.

Some of the AIDEN core functions/operations implemented and/or performed by the AIDEN may be AI functions. Example AI functions may include, but are not necessarily limited to only, any of: big data process (e.g., collecting big data such as various realtime or non-realtime text, messages such as requests/responses, audio such as dialogs and audio scenes, video captured by cameras and image sensors, documents, etc.), big data analysis (e.g., linear and non-linear regression analysis, Gaussian process regression analysis, data clustering, face detection/recognition, neural networks, etc.), trend prediction (e.g., use prediction models trained through AI based machine learning, etc.), natural language processing, deep learning, auto learning one-stop AI algorithm stores, etc.

Some of the AIDEN core functions/operations implemented and/or performed by the AIDEN may be service operational functions. Example service operational functions may include, but are not necessarily limited to only, any of: regulation compliance, local customer management, network and business extension, techniques for offering AI cloud services, etc.

For example, an operator or owner of an AI cloud engine located at an AI source region (e.g., the U.S.A., etc.) may not have operational license to operate its AI services in a non-AI-source region (e.g., China, etc.). The AI delivery edge network 102 can be provided by an operator or owner with necessary operational license to operate self-developed and/or sourced AI services in the non-AI-source region.

2.3. Accessing AI Services via AI Proxy Agent

Figure 3A:
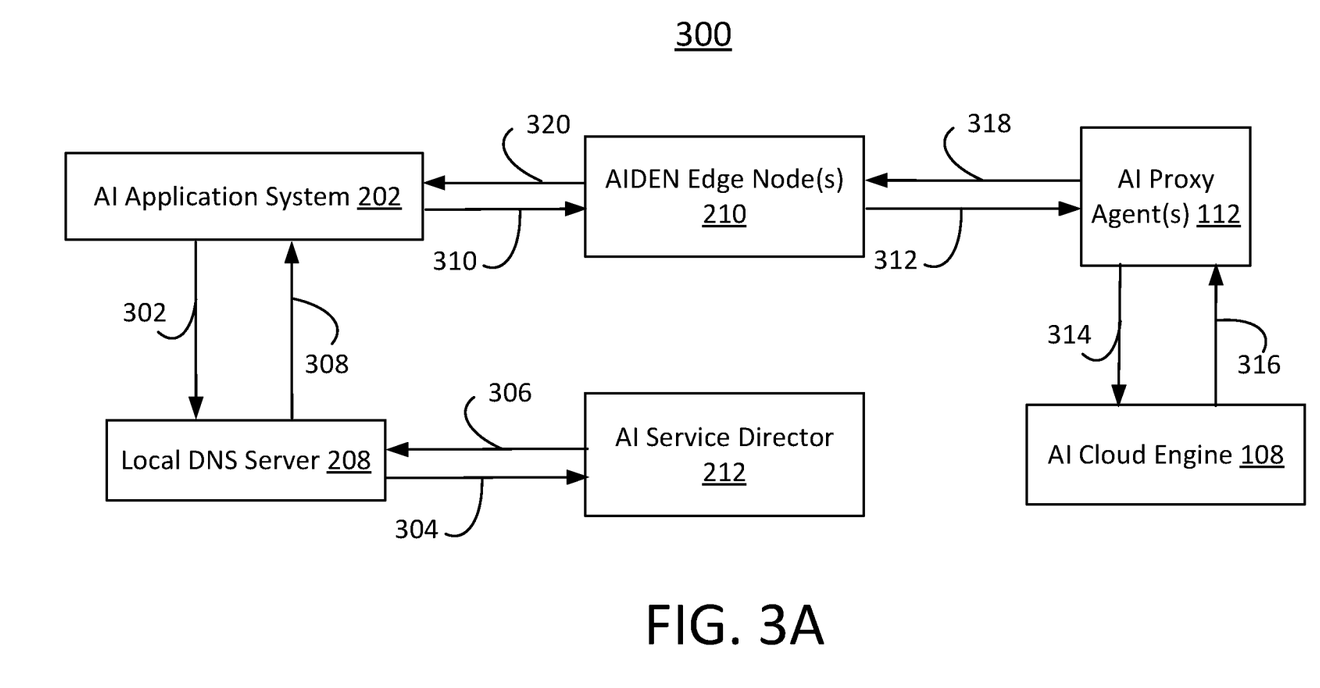
FIG. 3A through FIG. 3C and FIG. 4 illustrate example flows for accessing AI services through AIDEN.

FIG. 3A illustrates an example flow 300 for accessing AI services provided from an AI cloud engine (e.g., an original site, etc.) via an AI proxy agent, according to an embodiment. The various elements of flow 300 may be performed in a variety of systems, including an AI application system, a local DNS server, an AI service director, one or more AIDEN edge nodes, one or more AI proxy agents, one or more cloud engines, etc., of FIG. 1 or FIG. 2 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Flow 300 illustrates but one example flow for accessing AI services provided from an AI cloud engine (e.g., an original site, etc.) via an AI proxy agent. Other flows may involve additional or fewer steps, in potentially varying arrangements.

Block 302 comprises an AI application system 202 sending a DNS query (e.g., a recursive DNS query, etc.) to a local DNS server 208 for resolving a domain name for an AI cloud engine to a corresponding IP address in connection with accessing AI services originated from the AI cloud engine 108.

Block 304 comprises, in response to determining that the IP address for the domain name is not found in a local DNS server cache, the local DNS server 208 querying other name servers such as the AI Service Director 212, which may be implemented as an authoritative DNS server designated with authority for providing authoritative DNS information on domain names located in a portion of a DNS name space that includes the AI cloud engine 108 to which an AI service request is to be destined/addressed.

Block 306 comprises, in response to receiving a DNS query caused by a query of the domain name of the AI cloud engine from the local DNS server 208, the AI service director 212 selecting and returning an IP address of a specific AIDEN edge node 210 based on one or more selection criteria. Example selection criteria for selecting edge nodes may include, but not necessarily limited to, one or more of: proximities of the edge nodes to the AI application system 202, computing resources availabilities of the edge nodes, current resource usages of the edge nodes, etc.

Block 308 comprises, in response to receiving the IP address of the specific AIDEN edge node 210 from the AI service director 212, the local DNS server 208 returning to the AI application system 202 (e.g., a DNS client therein, etc.) and caching the IP address of the selected AIDEN edge node 210 as the IP address to which the domain name of the AI cloud engine 108 is now resolved (e.g., within a specific time period, etc.).

Block 310 comprises, in response to receiving the IP address of the selected AIDEN edge node from the local DNS server 208, the AI application system 202 (or an AI application running thereon, etc.) replacing the domain name of the AI cloud engine 108 with the IP address of the selected AIDEN edge node 210 and sending an AI service request to the selected AIDEN edge node 210. In addition, the IP address of the selected AIDEN edge node 210 may be saved in the AI application system DNS cache 206 as the IP address to which the domain name of the AI cloud engine 108 is now resolved (e.g., within the specific time period, etc.).

Block 312 comprises, in response to receiving the AI service request (e.g., HTTP message(s), JSON message(s), XML message(s), API calls, message(s) addressed to one or more web server end points, etc.) from the local DNS server 208, the selected AIDEN edge node 210 (or AI proxy service(s) 114 therein, etc.) communicating the AI service request (e.g., with the same received message(s) or message payload(s) from the AI application system 202, with transformed message(s) or message payload(s) from the AI application system 202, etc.) to an AI proxy agent 112, which may be selected from among a plurality of AI proxy agents deployed in the same network cloud as the AI cloud engine 108.

Communications between the AI proxy service(s) 114 in the selected AIDEN edge node 210 and the AI proxy agent 112 may be facilitated using a VPN, UDN, or the like, that penetrates any communication barriers such as the firewalls 110 of FIG. 1 separating the non-AI-source region in which the AIDEN is located from the AI source region in which the AI cloud engine 108 is located. These communications may or may not be made in accordance with a unified AI service interface.

Block 314 comprises, in response to receiving the AI service request (e.g., HTTP message(s), JSON message(s), XML message(s), API calls, message(s) addressed to one or more web server end points, etc.) from the selected AIDEN edge node 210, the AI proxy agent 112 communicating the AI service request (e.g., with the same received message(s) or message payload(s) from the selected AIDEN edge node 210, with transformed message(s) or message payload(s) from the selected AIDEN edge node 210, etc.) to the AI cloud engine 108.

Block 316 comprises, in response to receiving the AI service request (e.g., HTTP message(s), JSON message(s), XML message(s), API calls, message(s) addressed to one or more web server end points, etc.) from the AI proxy agent 112, the AI cloud engine 108 processing the AI service request, performing AI service operations relating to the AI service request, and communicating the results of the AI service operations back to the AI proxy agent 112 in an AI service response (e.g., HTTP message(s), JSON message(s), XML message(s), return values and/or error codes of API calls, etc.).

Block 318 comprises, in response to receiving the AI service response (e.g., HTTP message(s), JSON message(s), XML message(s), return values and/or error codes of API calls, etc.) from the AI cloud engine 108, the AI proxy agent 112 forwarding the AI service response (e.g., with the same received message(s) or message payload(s) from the AI cloud engine 108, with transformed message(s) or message payload(s) from the AI cloud engine 108, etc.) to the selected AIDEN edge node 210.

Block 320 comprises, in response to receiving the AI service response (e.g., HTTP message(s), JSON message(s), XML message(s), return values and/or error codes of API calls, etc.) from the AI proxy agent 112, the selected AIDEN edge node 210 forwarding the AI service response (e.g., with the same received message(s) or message payload(s) from the AI proxy agent 112, with transformed message(s) or message payload(s) from the AI proxy agent 112, etc.) to the AI application system 202.

2.4. Directly Accessing AI Cloud Engines

Figure 3B:
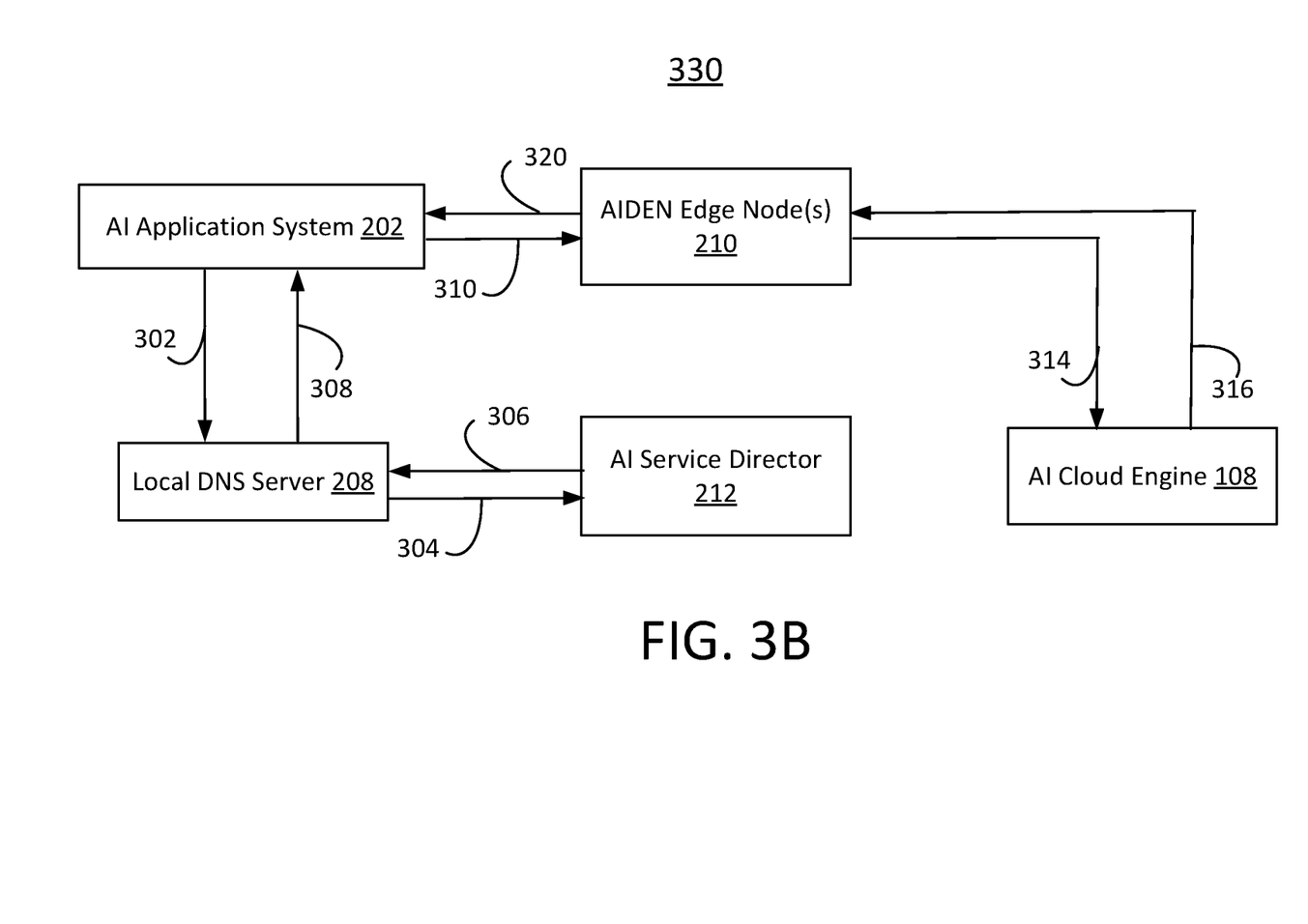

FIG. 3B illustrates an example flow 330 for accessing AI services directly provided from an AI cloud engine (e.g., an original site, without mediating through AI proxy services and/or AI proxy agents, etc.), according to an embodiment. The various elements of flow 330 may be performed in a variety of systems, including an AI application system, a local DNS server, an AI service director, one or more AIDEN edge nodes, one or more cloud engines, etc., of FIG. 1 or FIG. 2 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Flow 330 illustrates but one example flow for accessing AI services directly provided from an AI cloud engine (e.g., an original site, without mediating through AI proxy services and/or AI proxy agents, etc.). Other flows may involve additional or fewer steps, in potentially varying arrangements.

FIG. 3B features many blocks that function similarly or the same as those corresponding blocks in FIG. 3A, with several notable differences.

In block 314 of FIG. 3B, in response to receiving the AI service request (e.g., HTTP message(s), JSON message(s), XML message(s), API calls, message(s) addressed to one or more web server end points, etc.) from the AI application system 202, the selected AIDNE edge node 210 directly communicates the AI service request (e.g., with the same received message(s) or message payload(s) from the AI application system 202, with transformed message(s) or message payload(s) from the AI application system 202, etc.) to the AI cloud engine 108, without going through an AI proxy agent 112 as illustrated in FIG. 3A.

Likewise, in block 316 of FIG. 3B, in response to receiving the AI service request (e.g., HTTP message(s), JSON message(s), XML message(s), API calls, message(s) addressed to one or more web server end points, etc.) directly from the AIDEN edge node 210 without communication mediation of any AI proxy agent, the AI cloud engine 108 processes the AI service request, performs AI service operations relating to the AI service request, and communicates the results of the AI service operations directly back to the AIDEN edge node 210 in an AI service response (e.g., HTTP message(s), JSON message(s), XML message(s), return values and/or error codes of API calls, etc.).

Communications between the selected AIDEN edge node 210 (e.g., an API director, using RESTful implementations, using JSON formatted files, etc.) and the AI cloud engine 108 may be facilitated using a VPN, UDN, or the like, that penetrates any communication barriers such as the firewalls 110 of FIG. 1 separating the non-AI-source region in which the AIDEN is located from the AI source region in which the AI cloud engine 108 is located. These communications may or may not be made in accordance with a unified AI service interface.

2.5. Directly Providing AI Services from AIDEN

Figure 3C:
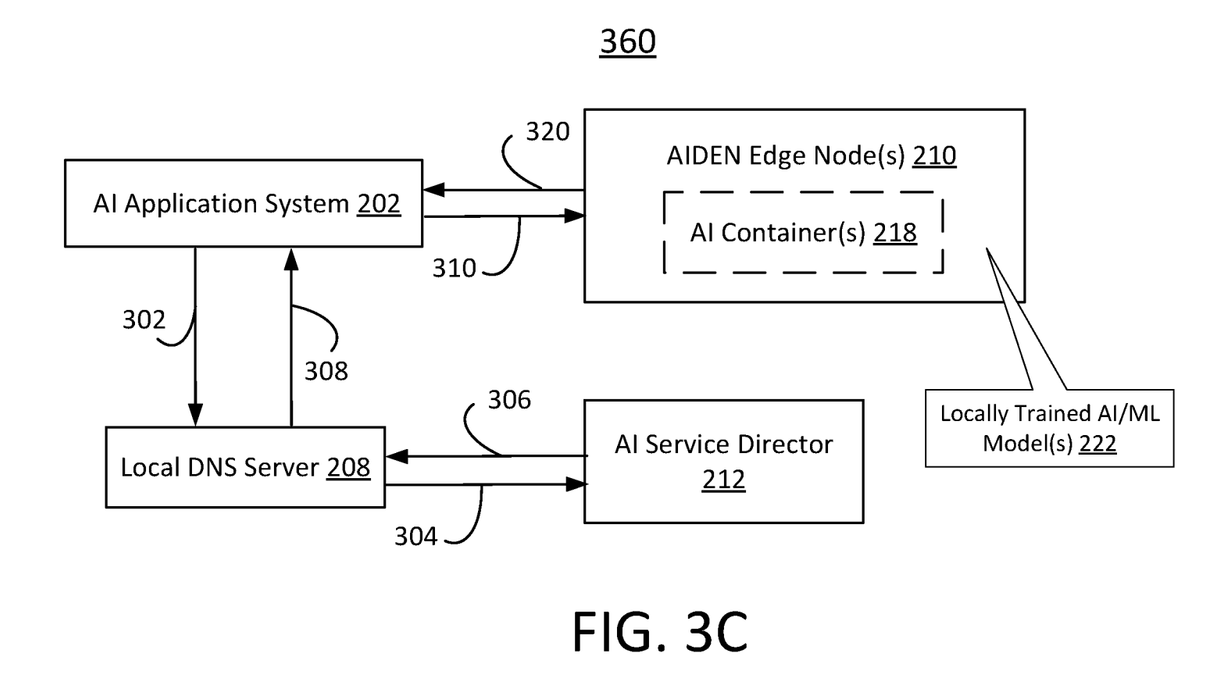

FIG. 3C illustrates an example flow 360 for accessing AI services (which may be derived from AI cloud engines) directly from an AI delivery network or edge/non-edge nodes therein, according to an embodiment. The AI services may be accessed without interacting with an original site and without mediating through AI proxy services and/or AI proxy agents to access an original site. The various elements of flow 360 may be performed in a variety of systems, including an AI application system, a local DNS server, an AI service director, one or more AIDEN edge nodes, etc., of FIG. 1 or FIG. 2 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Flow 360 illustrates but one example flow for accessing AI services directly from an AI delivery network or edge/non-edge nodes therein. Other flows may involve additional or fewer steps, in potentially varying arrangements.

FIG. 3C features many blocks that function similarly or the same as those corresponding blocks in FIG. 3A or FIG. 3B, with several notable differences.

Subsequent to block 310 and before block 320 of FIG. 3C, in response to receiving the AI service request (e.g., HTTP message(s), JSON message(s), XML message(s), API calls, message(s) addressed to one or more web server end points, etc.) from the AI application system 202, the selected AIDEN edge node 210 directly processes the AI service request, performs AI service operations relating to the AI service request, and communicates the results of the AI service operations directly back to the AI application system 202 (or the AI application running thereon) in an AI service response (e.g., HTTP message(s), JSON message(s), XML message(s), return values and/or error codes of API calls, etc.).

In some embodiments, the AIDEN edge node 210 (e.g., operating with other subsystems in the AIDEN, etc.) replicates, mirrors and/or caches some or all AI service stacks of some or all AI cloud engines locally. The local AI service stacks on or accessible by the AIDEN edge node 210 can be used by the AIDEN edge node 210 to generate AI service responses directly, without involving any AI cloud engines—with or without communication mediation of AI proxy services and AI proxy agent(s)—from which the local AI service stacks are derived.

Additionally, optionally or alternatively, the AIDEN, or one or more AI edge nodes therein, can implement some or all AI service stacks of some or all AI cloud engines, for example as a part of an AI container 218 of FIG. 3C. In some embodiments, an AI application as described herein may be directly hosted in the AI container 218 instead of in any external system. Thus, the AI application system 202 here may represent the AI container 218 hosted in the AIDEN edge node 210. In some embodiments, substantially the same or similar operations and/or interactions as described herein may be performed with an AI application hosted in an AI container (e.g., 218, etc.) of an AIDEN edge node (e.g., 210, etc.), as compared with an AI application hosted off an AIDEN edge node (e.g., 210, etc.).

Techniques as described herein can be used to support a wide variety of AI services. Example AI services include, but are not necessarily limited to, any of: collecting AI data from a wide variety of devices, sensors, systems, etc.; uploading and/or downloading AI data to and from the AIDEN, edge nodes therein, AI cloud engines, etc.; requesting and obtaining predictions based on any combination in a wide variety of AI/ML models/algorithms/methods/procedures; training and/or testing any combination in a wide variety of AI/ML models/algorithms/methods/procedures; generating optimized operational parameters, weights, functions and functionals, hyper parameters, etc., in a wide variety of AI/ML models/algorithms/methods/procedures; requesting and obtaining natural language processing results utilizing AI/ML models; and so forth.

For example, in some embodiments, the AI application system 202 may interact with the AIDEN edge node 210 to train one or more AI/ML models 222 locally stored in the AIDEN. The one or more locally trained AI/ML models 222 with model operational parameters locally stored with the AIDEN in a non-AI-source region can be used to make or contribute to one or more AI services that are derived from one or more AI cloud engines located in an AI-source region.

3.0. Example Embodiments

Figure 4:
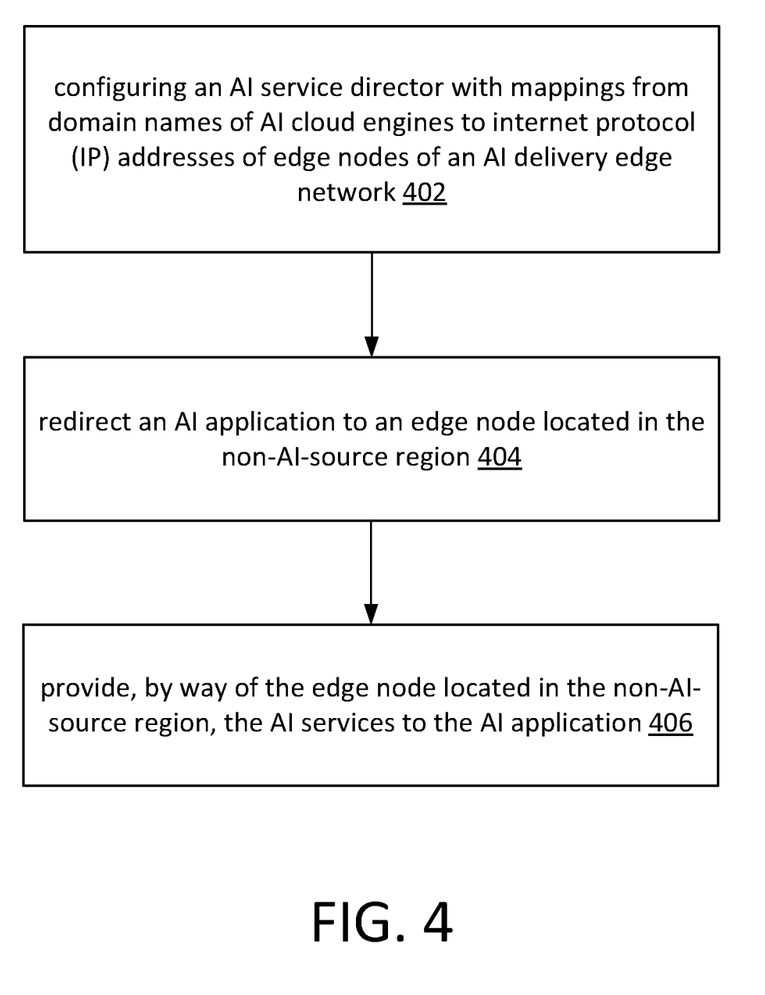

Examples of some embodiments are represented, without limitation, in the following paragraphs:

FIG. 4 illustrates an example process flow that may be implemented by one or more computing devices such as an AI Delivery Edge Network 102 of FIG. 1 or FIG. 2, or one or more subsystems therein, etc., as described herein. In block 402, the AIDEN 102 configures an artificial intelligence (AI) service director with one or more mappings from one or more domain names of one or more AI cloud engines to one or more internet protocol (IP) addresses of one or more edge nodes of an AI delivery edge network. The one or more AI cloud engines are located in an AI source region. The AI delivery edge network is deployed in a non-AI-source region.

In block 404, the AIDEN 102 redirects an AI application, which accesses one or more AI services using a domain name of an AI cloud engine in the one or more AI cloud engines located in the AI source region, to an edge node in the one or more edge nodes of the AI delivery edge network located in the non-AI-source region. The AI application is hosted in the non-AI-source region;

In block 406, the AIDEN 102 provides, by way of the edge node located in the non-AI-source region, the one or more AI services to the AI application.

In an embodiment, at least one of the one or more AI services is provided in real time or near real time from an AI cloud engine in the one or more AI cloud engines in the AI source region by way of an AI proxy service and an AI proxy agent.

In an embodiment, at least one of the one or more AI services is provided in real time or near real time from an AI cloud engine in the one or more AI cloud engines in the AI source region without communication mediation of an AI proxy service and an AI proxy agent.

In an embodiment, at least one of the one or more AI services is provided in real time or near real time from a locally cached AI service stack accessible by the edge node.

In an embodiment, AI data is exchanged between the AI application and the edge node, and wherein the AI data comprises one or more of: texts, messages, hyperlinks, images, audio, dialogs, audio scenes, videos, documents, AI model parameters, ML model parameters, and so forth.

In an embodiment, the one or more AI services are based on one or more of: linear regression analyses, decision trees, non-linear regression analyses, Gaussian process regression analyses, data clustering, face detection, face recognition, neural networks, trend prediction, natural language processing, deep learning, auto learning one-stop AI algorithm stores, healthcare related AI models, autonomous driving related AI models, and so forth.

In an embodiment, the AI application is in one or more non-AI-source computer networks in the non-AI-source region that are separated from one or more AI source computer networks located in the AI source region.

Other examples of these and other embodiments are found throughout this disclosure.

4.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 5:
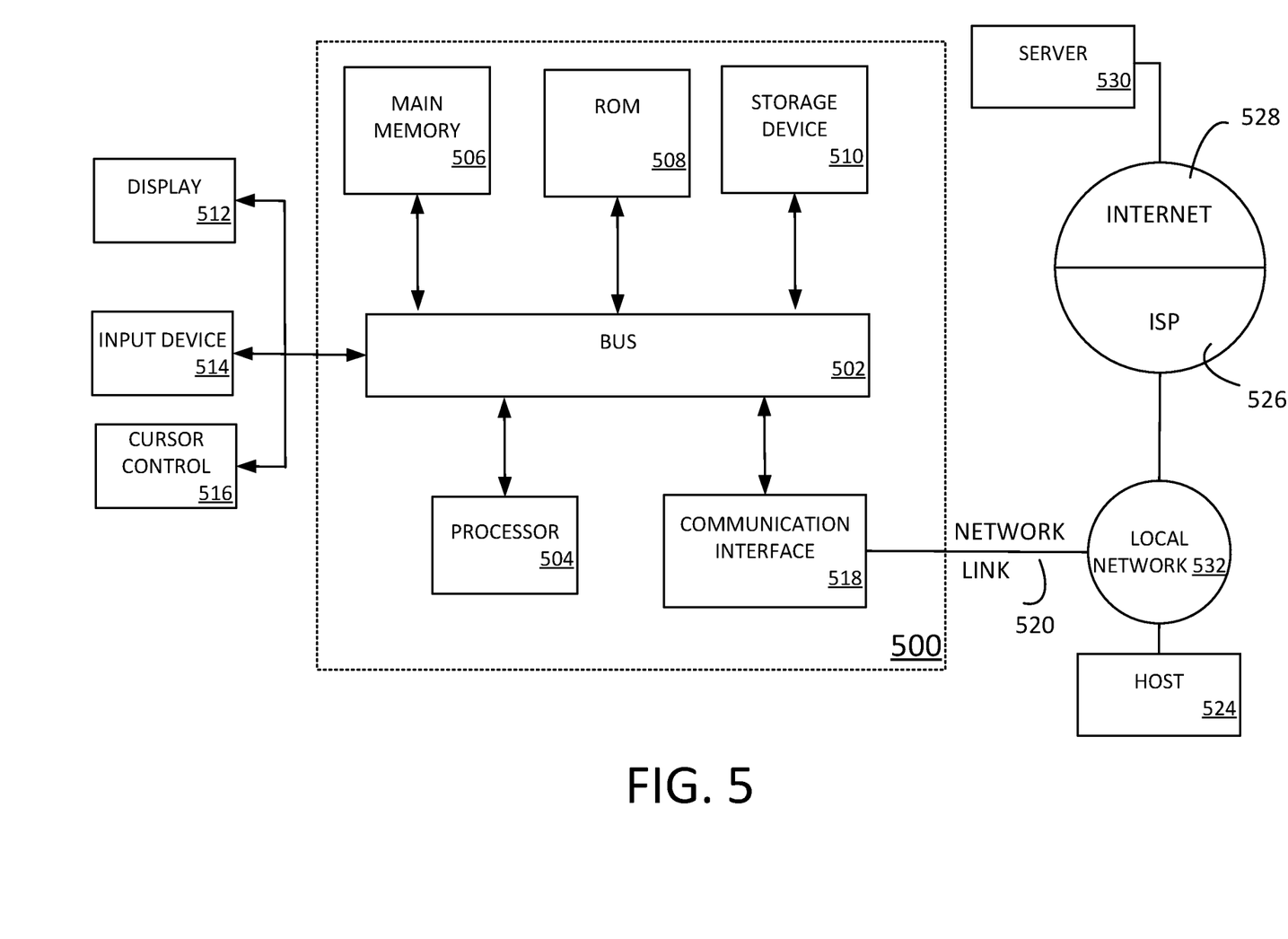
FIG. 5 is block diagram of a computer system upon which embodiments of the invention may be implemented.

FIG. 5 is a block diagram that illustrates a computer system 500 utilized in implementing the above-described techniques, according to an embodiment. Computer system 500 may be, for example, a desktop computing device, laptop computing device, tablet, smartphone, server appliance, computing main image, multimedia device, handheld device, networking apparatus, or any other suitable device.

Computer system 500 includes one or more busses 502 or other communication mechanism for communicating information, and one or more hardware processors 504 coupled with busses 502 for processing information. Hardware processors 504 may be, for example, a general purpose microprocessor. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes a main memory 506, such as a random access memory (RAM) or other dynamic or volatile storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, is provided and coupled to bus 502 for storing information and instructions.

Computer system 500 may be coupled via bus 502 to one or more displays 512 for presenting information to a computer user. For instance, computer system 500 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

In an embodiment, output to display 512 may be accelerated by one or more graphics processing unit (GPUs) in computer system 500. A GPU may be, for example, a highly parallelized, multi-core floating point processing unit highly optimized to perform computing operations related to the display of graphics data, 3D data, and/or multimedia. In addition to computing image and/or video data directly for output to display 512, a GPU may also be used to render imagery or other video data off-screen, and read that data back into a program for off-screen image processing with very high performance. Various other computing tasks may be off-loaded from the processor 504 to the GPU.

One or more input devices 514 are coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

A computer system 500 may implement techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions.

The instructions received by main memory 506 may optionally be stored on storage device 510 either before or after execution by processor 504.

A computer system 500 may also include, in an embodiment, one or more communication interfaces 518 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send messages and receive data, including program code and/or other types of instructions, through the network(s), network link 520, and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

In an embodiment, some or all of the systems described herein may be or comprise server computer systems, including one or more computer systems 500 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
configuring an artificial intelligence (AI) service director with one or more mappings from one or more domain names of one or more AI cloud engines to one or more internet protocol (IP) addresses of one or more edge nodes of an AI delivery edge network, wherein the one or more AI cloud engines are located in an AI source geographic region, wherein the AI delivery edge network is deployed in a non-AI-source geographic region other than the AI source geographic region;
redirecting an AI application, which accesses one or more AI services using a domain name of an AI cloud engine in the one or more AI cloud engines located in the AI source geographic region, to an edge node in the one or more edge nodes of the AI delivery edge network located in the non-AI-source geographic region, wherein the AI application is hosted in the non-AI-source geographic region;
providing, by way of the edge node located in the non-AI-source geographic region, the one or more AI services to the AI application;
causing the AI application to the edge node to invoke at least one of the one or more AI services to train a prediction model locally at the edge node.

2. The method of claim 1, wherein at least one of the one or more AI services is provided in real time or near real time from an AI cloud engine in the one or more AI cloud engines in the AI source geographic region by way of an AI proxy service and an AI proxy agent.

3. The method of claim 1, wherein at least one of the one or more AI services is provided in real time or near real time from an AI cloud engine in the one or more AI cloud engines in the AI source geographic region without communication mediation of an AI proxy service and an AI proxy agent.

4. The method of claim 1, wherein at least one of the one or more AI services is provided in real time or near real time from a locally cached AI service stack accessible by the edge node.

5. The method of claim 1, wherein AI data is exchanged between the AI application and the edge node, and wherein the AI data comprises one or more of: texts, messages, hyperlinks, images, audio, dialogs, audio scenes, videos, documents, AI model parameters, or machine learning (ML) model parameters.

6. The method of claim 1, wherein the one or more AI services are based on one or more of: linear regression analyses, decision trees, non-linear regression analyses, Gaussian process regression analyses, data clustering, face detection, face recognition, neural networks, trend prediction, natural language processing, deep learning, auto learning one-stop AI algorithm stores, healthcare related AI models, or autonomous driving related AI models.

7. The method of claim 1, wherein the AI application is in one or more non-AI-source computer networks in the non-AI-source geographic region that are separated from one or more AI source computer networks located in the AI source geographic region.

8. A non-transitory computer readable medium that stores computer instructions which, when executed by one or more computing processors, cause the one or more computing processors to perform:
configuring an artificial intelligence (AI) service director with one or more mappings from one or more domain names of one or more AI cloud engines to one or more internet protocol (IP) addresses of one or more edge nodes of an AI delivery edge network, wherein the one or more AI cloud engines are located in an AI source geographic region, wherein the AI delivery edge network is deployed in a non-AI-source geographic region other than the AI source geographic region;
redirecting an AI application, which accesses one or more AI services using a domain name of an AI cloud engine in the one or more AI cloud engines located in the AI source geographic region, to an edge node in the one or more edge nodes of the AI delivery edge network located in the non-AI-source geographic region, wherein the AI application is hosted in the non-AI-source geographic region;
providing, by way of the edge node located in the non-AI-source geographic region, the one or more AI services to the AI application;
causing the AI application to the edge node to invoke at least one of the one or more AI services to train a prediction model locally at the edge node.

9. The medium of claim 8, wherein at least one of the one or more AI services is provided in real time or near real time from an AI cloud engine in the one or more AI cloud engines in the AI source geographic region by way of an AI proxy service and an AI proxy agent.

10. The medium of claim 8, wherein at least one of the one or more AI services is provided in real time or near real time from an AI cloud engine in the one or more AI cloud engines in the AI source geographic region without communication mediation of an AI proxy service and an AI proxy agent.

11. The medium of claim 8, wherein at least one of the one or more AI services is provided in real time or near real time from a locally cached AI service stack accessible by the edge node.

12. The medium of claim 8, wherein AI data is exchanged between the AI application and the edge node, and wherein the AI data comprises one or more of: texts, messages, hyperlinks, images, audio, dialogs, audio scenes, videos, documents, AI model parameters, or machine learning (ML) model parameters.

13. The medium of claim 8, wherein the one or more AI services are based on one or more of: linear regression analyses, decision trees, non-linear regression analyses, Gaussian process regression analyses, data clustering, face detection, face recognition, neural networks, trend prediction, natural language processing, deep learning, auto learning one-stop AI algorithm stores, healthcare related AI models, or autonomous driving related AI models.

14. The medium of claim 8, wherein the AI application is in one or more non-AI-source computer networks in the non-AI-source geographic region that are separated from one or more AI source computer networks located in the AI source geographic region.

15. An apparatus, comprising:
one or more computing processors;
a non-transitory computer readable medium that stores computer instructions which, when executed by the one or more computing processors, cause the one or more computing processors to perform:
configuring an artificial intelligence (AI) service director with one or more mappings from one or more domain names of one or more AI cloud engines to one or more internet protocol (IP) addresses of one or more edge nodes of an AI delivery edge network, wherein the one or more AI cloud engines are located in an AI source geographic region, wherein the AI delivery edge network is deployed in a non-AI-source geographic region;

redirecting an AI application, which accesses one or more AI services using a domain name of an AI cloud engine in the one or more AI cloud engines located in the AI source geographic region, to an edge node in the one or more edge nodes of the AI delivery edge network located in the non-AI-source geographic region, wherein the AI application is hosted in the non-AI-source geographic region;

providing, by way of the edge node located in the non-AI-source geographic region, the one or more AI services to the AI application;

causing the AI application to the edge node to invoke at least one of the one or more AI services to train a prediction model locally at the edge node.

16. The apparatus of claim 15, wherein at least one of the one or more AI services is provided in real time or near real time from an AI cloud engine in the one or more AI cloud engines in the AI source geographic region by way of an AI proxy service and an AI proxy agent.

17. The apparatus of claim 15, wherein at least one of the one or more AI services is provided in real time or near real time from an AI cloud engine in the one or more AI cloud engines in the AI source geographic region without communication mediation of an AI proxy service and an AI proxy agent.

18. The apparatus of claim 15, wherein at least one of the one or more AI services is provided in real time or near real time from a locally cached AI service stack accessible by the edge node.

19. The apparatus of claim 15, wherein AI data is exchanged between the AI application and the edge node, and wherein the AI data comprises one or more of: texts, messages, hyperlinks, images, audio, dialogs, audio scenes, videos, documents, AI model parameters, or machine learning (ML) model parameters.

20. The apparatus of claim 15, wherein the one or more AI services are based on one or more of: linear regression analyses, decision trees, non-linear regression analyses, Gaussian process regression analyses, data clustering, face detection, face recognition, neural networks, trend prediction, natural language processing, deep learning, auto learning one-stop AI algorithm stores, healthcare related AI models, or autonomous driving related AI models.

21. The apparatus of claim 15, wherein the AI application is in one or more non-AI-source computer networks in the non-AI-source geographic region that are separated from one or more AI source computer networks located in the AI source geographic region.

* * * * *